(12) United States Patent
Aoki et al.

(10) Patent No.: US 7,183,705 B2
(45) Date of Patent: Feb. 27, 2007

(54) PLASMA DISPLAY UNIT, PHOSPHOR AND PROCESS FOR PRODUCING PHOSPHOR

(75) Inventors: Masaki Aoki, Osaka (JP); Hiroyuki Kawamura, Osaka (JP); Kazuhiko Sugimoto, Kyoto (JP); Mitsuhiro Otani, Osaka (JP); Hiroshi Setoguchi, Osaka (JP); Junichi Hibino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 344 days.

(21) Appl. No.: 10/485,148

(22) PCT Filed: May 15, 2003

(86) PCT No.: PCT/JP03/06048

§ 371 (c)(1),
(2), (4) Date: Jan. 29, 2004

(87) PCT Pub. No.: WO03/097768

PCT Pub. Date: Nov. 27, 2003

(65) Prior Publication Data

US 2004/0217706 A1 Nov. 4, 2004

(30) Foreign Application Priority Data

May 17, 2002 (JP) ............... 2002-142661

(51) Int. Cl.
*H01J 1/62* (2006.01)
*C09K 11/02* (2006.01)
*C09K 11/77* (2006.01)

(52) U.S. Cl. ............... 313/486; 252/301.4 R; 313/582; 313/485

(58) Field of Classification Search ............... 313/486; 252/301.4 R
See application file for complete search history.

(56) References Cited

U.S. PATENT DOCUMENTS 4,388,245 A * 6/1983 Ueyanagi et al. ........... 560/351
5,714,835 A * 2/1998 Zachau et al. .............. 313/486

(Continued)

FOREIGN PATENT DOCUMENTS

JP          8-115673        5/1996

(Continued)

OTHER PUBLICATIONS

"Phosphor Handbook", p. 219-220, published from Ohm Co., Ltd. on Dec. 25, 1987 with partial translation.

(Continued)

*Primary Examiner*—Mariceli Santiago
*Assistant Examiner*—Anne M Hines
(74) *Attorney, Agent, or Firm*—Wenderoth, Lind & Ponack, L.L.P.

(57) ABSTRACT

A plasma display device comprises blue phosphor which restricts adsorption of water and hydrocarbon gases to a surface thereof, reduces degradation of luminance and chromaticity change, and improves discharge characteristic. Among phosphor layers used for a plasma display, a blue phosphor layer comprises one of compounds symbolized by $Ba_{1-x}MgAl_{10}O_{17}:Eu_x$ and $Ba_{1-x-y}Sr_yMgAl_{10}O_{17}:Eu_x$, of which phosphor contains 0.2 to 0.8 in number x of Eu atoms, and the Eu atoms comprises 25% to 85% concentration of bivalent Eu ions, and 15% to 75% concentration of trivalent Eu ions.

5 Claims, 5 Drawing Sheets

U.S. PATENT DOCUMENTS

| | | | |
|---|---|---|---|
| 6,096,243 | A | 8/2000 | Oshio et al. |
| 6,660,186 | B2 * | 12/2003 | Ravilisetty ........... 252/301.4 R |
| 2001/0054869 | A1 * | 12/2001 | Ono et al. .................. 313/582 |
| 2004/0051440 | A1 * | 3/2004 | Sugimoto et al. ........... 313/486 |

FOREIGN PATENT DOCUMENTS

| | | |
|---|---|---|
| JP | 9-310067 | 12/1997 |
| JP | 11-181418 | 7/1999 |
| JP | 11-323325 | 11/1999 |
| JP | 2000-226575 | 8/2000 |
| JP | 2001-55567 | 2/2001 |
| JP | 2002-80848 | 3/2002 |

OTHER PUBLICATIONS

N. Kijima, "Crystal Structure and Degradation Mechanism of Blue Phosphor", Display and Imaging, 1999, vol. 7, pp. 225-234.

Hajime Yamamoto, "Phosphors For Next-Generation Display Devices", Applied Physics, vol. 70, No. 3 (2001), pp. 309-312 with partial translation.

M. Shiiki et al., "Thermal degradation of PDP phosphors", Technical Report of IEICE. EID99-94 (Jan. 2001), pp. 117-122.

* cited by examiner

PLASMA DISPLAY UNIT, PHOSPHOR AND PROCESS FOR PRODUCING PHOSPHOR

TECHNICAL FIELD

The present invention relates to plasma display devices used for displaying images such as televisions. The invention also relates to phosphor, and a method of manufacturing the phosphor.

BACKGROUND ART

In the field of color display devices used for displaying images such as computers and televisions, display units provided with plasma display panels (hereinafter referred to as PDP) enjoy popularity in recent years as color display devices of large screen with capability of realizing thin profile and light weight.

A plasma display device provided with a PDP gives full color display by mixing so-called three primary colors (i.e., red, green and blue). To display images in full color, the plasma display device is provided with phosphor layers for emitting individually the three primary colors, or red (R), green (G) and blue (B), in which phosphor particles composing the phosphor layers are excited by ultraviolet rays generated inside discharge cells of the PDP, to produce visible light of the individual colors.

Examples of chemical compounds known as phosphors of the individual colors noted above include $(YGd)BO_3$; $Eu^{3+}$ for emitting red light, $Zn_2SiO_4:Mn^{2+}$ for emitting green light, and $BaMgAl_{10}O_{17}:Eu^{2+}$ for emitting blue light. Each of these phosphors is produced by means of solid phase reaction in which prescribed raw materials are mixed and fired at a temperature as high as 1000° C. (refer to, for example, "Phosphor Handbook", published by Ohmsha, Ltd., PP.219–220). The phosphor particles obtained by this firing are ground and sifted before use (so that the red and green phosphor particles have a mean particle diameter of 2 μm to 5 μm, while the blue phosphor particles have a mean particle diameter of 3 μm to 10 μm). The phosphor particles are ground and sifted (classified) for the following reason. In general, paste including the phosphor particles having each color is applied by screen printing to form the phosphor layer in the PDP. The surface of the paste applied easily becomes smoother if the particle diameters of the phosphor are smaller and more uniform (in particle size distribution). In other words, the smaller and the more uniform the particle diameters of the phosphor and the more spherical the phosphor particles, the smoother the applied surface. Accordingly, packing density and a light-emitting surface area of the phosphor particles in the phosphor layer conceivably increase, thus increasing luminance of the plasma display device.

Figure 6:
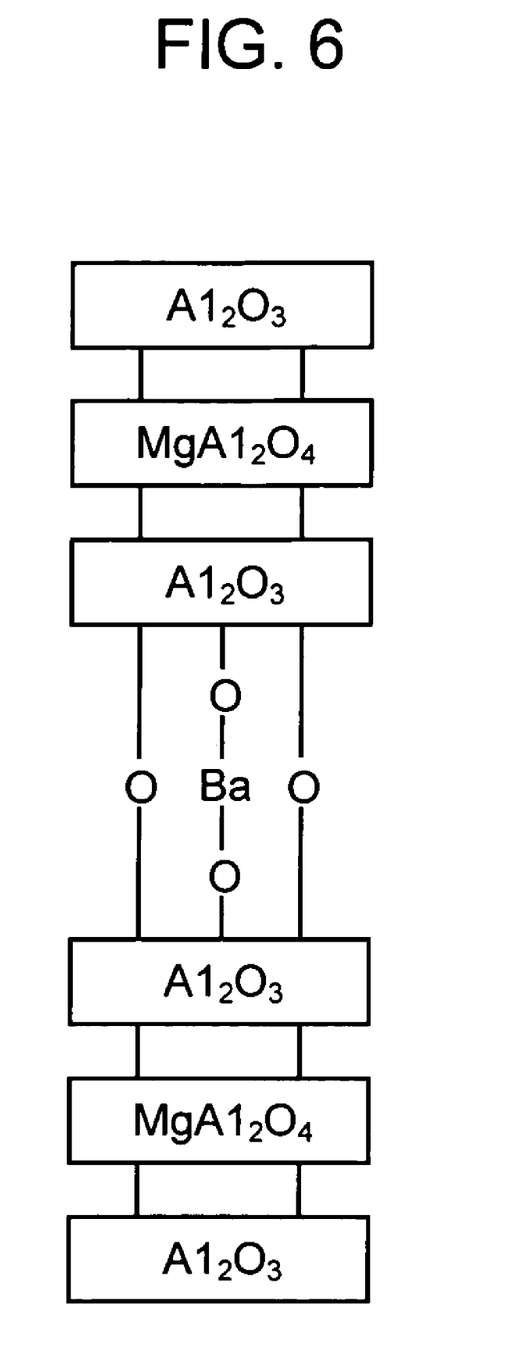
FIG. 6 is a schematic drawing showing an atomic structure of blue phosphor according to the an example of the background art (conventional example).

However, reducing the particle diameters of the phosphor particles increases the surface area of the phosphor and thus increases the number of defects in the phosphor. For this reason, a large amount of water, carbon dioxide or hydrocarbon-containing organic substances easily adheres to the surface of the phosphor. For a blue phosphor, including a divalent Eu ion as a luminescence center, such as $Ba_{1-x}MgAl_{10}O_{17}:Eu_x$ or $Ba_{1-x-y}Sr_yMgAl_{10}O_{17}:Eu_x$, in particular, its crystal structure has a layer structure (refer to, for example, "Display and Imaging", 1999, Vol. 7, pp. 225–234). This layer structure includes an oxygen (O) vacancy in the vicinity of a layer (Ba—O layer) including a Ba atom, and the smaller the particle diameters, the more these vacancies problematically increase in number (refer to, for example, "OYO BUTSURI (Applied Physics)", Vol. 70, No. 3, 2001, p. 310). FIG. 6 schematically illustrates the structure of the Ba—O layer of the blue phosphor, $Ba_{1-x}MgAl_{10}O_{17}:Eu_x$.

For the above reason, water existing in the air or hydrocarbon-containing gas selectively adsorbs on the surface of such a Ba—O layer. Such water and gas are released into the panel in large amounts in a panel manufacturing process and react with the phosphor and MgO during discharge, thus problematically degrading the luminance, causing a change in chromaticity (which leads to a color shift or a burn on a screen), reducing a drive margin and raising discharge voltage.

Moreover, since water and hydrocarbon group gases are selectively adsorbed by the blue phosphor, they make ethyl cellulose in binder difficult to be adsorbed by the blue phosphor in the process of making paste and ink. This causes the phosphor and the ethyl cellulose easily separable. If the ethyl cellulose and the phosphor separate, the phosphor accumulates in the vicinity of an opening in a nozzle of thin diameter where the velocity has no gradient when the phosphor ink is being sprayed from the nozzle, thereby giving rise to a problem of choking up the nozzle opening.

After a phosphor layer is formed by such a method as screen printing or inkjet printing, it is necessary to fire the phosphor layer at 500 to 600° C. to remove the organic binder and solvent elements in the ink or the paste. It is also necessary to fire the phosphor layer again at 400 to 450° C. in a sealing process and the like in which a front glass substrate and a rear glass substrate are bonded together with frit glass. These firing processes cause degradation in luminance of the ordinary phosphor such as $Ba_{1-x}MgAl_{10}O_{17}:Eu_x$ and $Ba_{1-x-y}Sr_yMgAl_{10}O_{17}:Eu_x$ used previously. There was therefore disclosed a technique to reduce the number x of Eu atoms to 0.1 or less, in order to alleviate the luminance degradation (e.g., Japanese Patent Unexamined Publication, No. H11-323325).

Furthermore, it is also known that deficiencies are produced in the phosphor by ultraviolet rays having a wavelength of 147 nm generated by electrical discharge while the panel is operated (refer to Technical Report, EID99-94, published on Jan. 27, 2000 by The Institute of Electronics, Information and Communication Engineers).

To solve these problems, there was proposed a method of compensating oxygen vacancies in the blue phosphor by firing the phosphor in an oxidative environment. Although this method corrects the oxygen vacancies, it gives another problem that luminance of the phosphor decreases.

There was also proposed another method in which crystals of $Al_2O_3$ are coated over the entire surface of the phosphor, to repair the deficiencies in the Ba—O layer. However, the coating layer absorbs ultraviolet rays and prevents them from reaching the phosphor in this case, thereby giving rise to still another problem of reducing the luminous luminance.

In addition, there is another method of reducing the oxygen vacancies, in which a part of bivalent Eu (15% or less) is replaced with trivalent Eu by firing blue phosphor of $Ba_{1-x}MgAl_{10}O_{17}:Eu_x$ having 0.2 or less in amount x of Eu atoms in an environment containing oxygen gas. However, this method changes only about 15% of the bivalent Eu. It is thus insufficient to avoid the problem of choke-up in the nozzle, and it still gives the problem of reducing luminance.

The present invention addresses the problems discussed above, and it aims at preventing luminance degradation and chromaticity change of the phosphor, and improving a discharge characteristic by eliminating the oxygen vacancies in the vicinity of the layer containing amount of Ba (i.e., Ba—O layer), to restrain adsorption of water and hydrocarbon to the surface of the blue phosphor.

DISCLOSURE OF THE INVENTION

To solve the above problems, a plasma display panel device of the present invention has a structure described below.

That is, the plasma display device is provided with a plasma display panel having a plurality of rows of discharge cells for one or plural colors, and color phosphor layers disposed in a manner to correspond individually with the discharge cells, wherein the phosphor layers are excited by ultraviolet rays to emit light. The phosphor layers include a blue phosphor layer comprising phosphor symbolized by one of $Ba_{1-x}MgAl_{10}O_{17}:Eu_x$ and $Ba_{1-x-y}Sr_yMgAl_{10}O_{17}:Eu_x$, the phosphor contains 0.2 to 0.8 in number x of Eu atoms, and the Eu atoms comprises 25% to 85% concentration of bivalent Eu ions, and 15% to 75% concentration of trivalent Eu ions.

In the structure constructed above, the blue phosphor is so composed as to contain 20% to 80% in amount of the Eu (i.e., the amount x of Eu is given as $0.2 \leq x \leq 0.8$) that replaces Ba atoms and Sr atoms within the blue phosphor, which is a substantial increase as compared with the prior art phosphor, and 15% to 75% of the bivalent Eu in the blue phosphor is replaced by trivalent Eu. This invention can thus eliminate oxygen vacancies in the vicinity of a layer containing Ba (i.e., Ba—O layer), and restrain the blue phosphor from adsorbing water and hydrocarbon group gases to its surface, thereby preventing luminance degradation and chromaticity change of the panel, and improving a discharge characteristic without reducing luminance of the phosphor.

In the drawings, the reference numerals are as follows.
100—PDP
101—front glass substrate
102—is rear glass substrate
103—display electrodes
104—display scan dielectrodes.
105,108—dielectric glass layer
106—protective layer
107—address electrodes
109—barrier ribs
110R, 110G, 110B—phosphor layers
121—hermetic seal layer
122—discharge space
123—image display area
152—controller
153—driver circuit
154—display scan driver circuit
155—address driver circuit
200—phosphor ink coating apparatus
210—server
220—pump
230—header
230a—ink chamber
240—nozzle
250—ink

DETAILED DESCRIPTION OF PREFERRED EMBODIMENTS

Referring to the accompanying drawings, description is now provided of an exemplary embodiment of this invention.

We, the inventors discovered that an essential cause of degradation in luminance of phosphor is not only presence of oxygen (O) vacancies themselves, but the degradation in luminance and variation in color occur due to reaction of the phosphor with water and hydrocarbon, because the oxygen vacancies present in the vicinity of a Ba—O layer selectively adsorbs water, carbon dioxide and hydrocarbon group gases, and the adsorbed water and gases receive irradiation of ultraviolet rays and ions. In other words, we found that degradation of various properties is attributable to the water, carbon dioxide and hydrocarbon-based gases adsorbed into the oxygen vacancies in the vicinity of the Ba—O layer in the blue phosphor.

Eu (europium) atoms in the blue phosphor of $BaMgAl_{10}O_{17}:Eu$ enter in a lattice structure of Ba (barium) and stay there as bivalent positive ions. When a part of the bivalent ions are replaced with trivalent Eu ions by oxidation and the like of the phosphor, an amount of positive electric charge increases inside of its crystal. It is thought that oxygen atoms carrying negative electric charge fills the oxygen vacancies in the vicinity of Ba elements to neutralize the positive charge and balance the electric charges. The oxygen vacancies in the vicinity of the Ba—O layer can be reduced, as a result.

The fewer the oxygen vacancies are, the less a degree of degradation in each manufacturing process. However, an excessive amount of trivalent ions is not desirable because they cause a reduction in the luminance. When amount x of Eu is 0.2 or more, in particular, it is desirable that an amount of the trivalent Eu ions is maintained between 15% and 75%.

Luminance of the phosphor is retained properly even after the phosphor is fired in an oxidative environment to eliminate the oxygen vacancies, when amount x of the Eu that replaces Ba and Sr atoms is maintained between 0.2 (20%) or more but 0.8 (80%) or less, sine 25% of bivalent Eu still exists after a great portion of the bivalent Eu (75% in this instance) is replaced with trivalent Eu.

Accordingly, since the phosphor is fired in the oxidative environment with an increased amount of Eu (0.2 or more in the amount x) as compared to the prior art technique, this embodiment realizes a PDP of low degradation without decreasing luminance in each of the manufacturing processes even though it introduces a large amount of trivalent Eu ions.

Although there are a number of methods thought to be useful for manufacturing the blue phosphor of this invention, description is provided first of an example using solid phase reaction. Raw materials of carbonate compound and oxide compound such as $BaCO_3$, $MgCO_3$, $Al_2O_3$, $Eu_2O_3$, and the like are mixed with a small amount of flux ($AlF_3$ or $BaC_{12}$) serving as a sintering accelerator, and flied in air for about two hours at 1400° C. At this point, all of the Eu ions are bivalent. It is then pulverized, sieved, and fired again for about two hours at 1500° C. in a reducing environment (i.e., 5% $H_2$ in $N_2$), followed by pulverization and sieving to produce phosphor.

Next, this phosphor is fired at 700 to 1100° C. in an oxidative environment containing any of oxygen ($O_2$), oxygen-nitrogen ($O_2$—$N_2$), water vapor-nitrogen ($H_2O$—$N_2$), and ozone-nitrogen ($O_3$—$N_2$), to turn a part of the bivalent Eu ions into trivalent ions. However, the firing for oxidation in the oxidative environment may be carried out in the same furnace immediately after the reducing process at 1500° C., when the temperature keeps falling from 1100 to 700° C.

The firing temperature in the oxidative environment is set between 700 and 1100° C. because it was found that a part of the bivalent Eu ions turns effectively into trivalent ions without causing degradation of the luminance at any temperature therebetween, whereas the luminance decreases substantially if temperature is lower than 700° C. or higher than 1100° C.

Description is given next of a case of using a liquid phase method for making phosphor from aqueous solution.

Organometallic salt (alkoxide and acetyl-acetone, for instance) or nitrate containing elements that compose phosphor is dissolved in water, and it is hydrolyzed to produce substance of coprecipitation (i.e., hydrate). The substance is then subjected to any of hydrothermal synthesis for making crystal in an autoclave, firing in air, and spray in a high temperature furnace, to obtain fine powder. The fine powder is fired at 1500° C. in a reducing environment (5% $H_2$ in NO, followed by pulverization and sieving. It is then fired at 700 to 1100° C. in an environment of oxygen ($O_2$), oxygen-nitrogen ($O_2$—$N_2$) and ozone-nitrogen ($O_3$—$N_2$), to produce the phosphor.

It is desirable to maintain 15% to 75% in amount of trivalent Eu ions that replace bivalent Eu ions. The replaced trivalent Eu ions do not provide a satisfactorily effect of preventing choke-up of a nozzle and degradation of luminance if the amount is 15% or less. On the other hand, decrease in luminance of the phosphor is also observed if the amount exceeds 75%. In this embodiment, we used EXAFS measurements (i.e., X-ray absorption near-edge structure) for verification that a part of the bivalent Eu ions has changed to trivalent ions.

As described above, this embodiment allows use of a conventional manufacturing process for the blue phosphor to replace 15% to 75% of bivalent Eu ions in $Ba_{1-x}MgAl_{10}O_{17}$:$Eu_x$ (wherein $0.2 \leq x \leq 0.8$) by trivalent Eu ions. The result thus obtained is the blue phosphor without degradation in luminance, and having durability to water and carbon dioxide generated while undergoing a phosphor firing process, a panel sealing process, a panel aging process, and when the panel is being operated. This embodiment also realizes the blue phosphor which does not choke up a nozzle opening even when it is discharged using an inkjet method.

Particles of the blue phosphor made of $Ba_{1-x}MgAl_{10}O_{17}$:$Eu_x$ or $Ba_{1-x-y}Sr_yMgAl_{10}O_{17}$:$Eu_x$ (wherein $0.2 \leq x \leq 0.8$) carrying 15% to 75% of the bivalent Eu ions replaced by trivalent Eu ions have good particulate distribution, as their particulate diameters are as small as 0.05 μm to 3 μm. When phosphor particles forming a phosphor layer are spherical in shape, they further improve a filling density and increase an area of luminous surface of the phosphor particles that contribute substantially to emission of light. The embodiment can thus provide the plasma display device with improvement of luminance and a superior luminance characteristic while reducing degradation in the luminance and variation in color. Furthermore, it is more desirable to set a mean diameter of the phosphor particles in a range of 0.1 μm to 2.0 μm. Moreover, it is also desirable as a diametric distribution that the maximum particulate diameter is four times the mean value or smaller, and the minimum diameter is ¼ of the mean value or larger. In other words, 2.0 μm or less in diameter of these phosphor particles increases a surface area of the particles that contributes the emission of light, and maintains a high luminous efficiency, since ultraviolet rays reach only a shallow portion of the particles of the order of several hundred nanometers from the surface of the particles so that only the shallow surface emits the light. If the particulate diameter is 3.0 μm or greater, for instance, the phosphor layer requires 20 μm or more in thickness in consideration of an optimum number of layers, which makes it difficult to ensure an enough space for electrical discharges. On the other hand, the particulate diameter of 0.1 μm or less is liable to carry deficiencies which reduce luminance.

Moreover, the phosphor layer is formed into a thickness in a range of 8 to 25 times the mean particle diameter of the phosphor particles, so as to ensure the sufficient space for electrical discharge while maintaining a high luminous efficiency of the phosphor layer. This can increase luminance of the plasma display device. It has been known that this effect is especially significant when the phosphor has a mean particle diameter of 3 μm or less.

In other words, concrete phosphor particles used for blue phosphor layers in the plasma display device are one of compounds known as $Ba_{1-x-y}MgAl_{10}O_{17}$:$Eu_x$ and $Ba_{1-x-y}Sr_yMgAl_{10}O_{17}$:$Eu_x$, in which 15% to 75% of bivalent Eu ions are replaced by trivalent Eu ions. The phosphor layers can produce high luminance when the compounds have x and y values of $0.2 \leq x \leq 0.8$ and $0.1 \leq y \leq 0.5$ respectively.

On the other hand, concrete phosphor particles suitable for red phosphor layers in the plasma display device are one of compounds known as $Y_{2-x}O_3$:$Eu_x$ and $(Y, Gd)_{2-x}BO_3$:$Eu_x$. It is desirable in view of the luminance and the luminance degradation that the compounds for red phosphor have x value of $0.05 \leq X \leq 0.20$.

Furthermore, concrete phosphor particles suitable for green phosphor layers in the plasma display device are one of compounds known as $Ba_{1-x}Al_{10}O_{19}$:$Mn_x$ and $Zn_{2-x}SiO_4$:$Mn_x$. It is desirable in view of the luminance and the luminance degradation that the compounds for green phosphor have x value of $0.01 \leq X \leq 0.10$.

A method of manufacturing PDPs according to the present invention comprises a forming process, a firing process and a sealing process. In the forming process, blue phosphor particles composed of one of $Ba_{1-x}MgAl_{10}O_{17}$:$Eu_x$ and $Ba_{1-x-y}Sr_yMgAl_{10}O_{17}$:$Eu_x$ (wherein $0.2 \leq x \leq 0.8$), in which 15% to 75% of bivalent Eu ions are replaced by trivalent Eu ions, red phosphor particles and green phosphor particles are mixed individually with binder to form phosphor pastes. These phosphor pastes are spray coated from their respective nozzles onto a substrate of rear panel. In the firing process, the binder contained in the pastes on the panel is burnt up. In the sealing process, the rear panel provided with the phosphor particles formed in the firing process is placed together with a front panel carrying display electrodes, and sealed. These processes provide a plasma display device with excellent luminance and free from degradation of the luminance.

Referring to the accompanying drawings, description is provided hereinafter of a plasma display device according to this exemplary embodiment of the invention.

Figure 1:
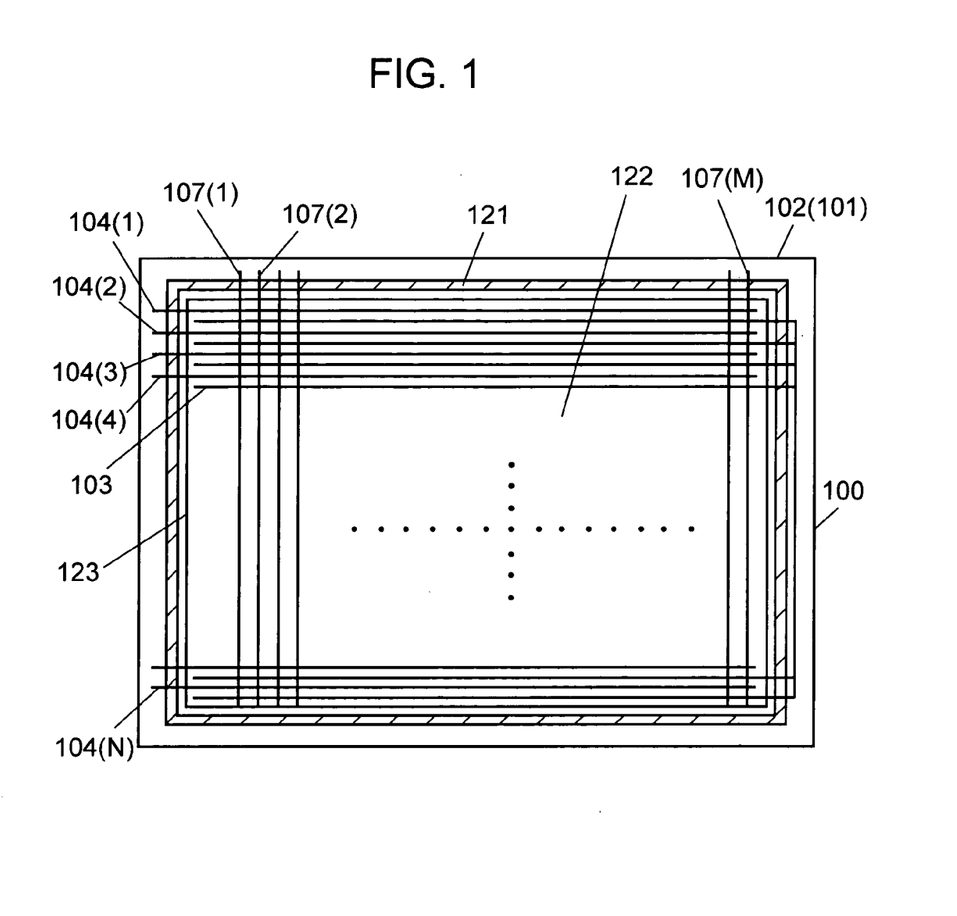
FIG. 1 is a plan view showing a general structure of electrode pattern of a PDP according to an exemplary embodiment of the present invention.
Figure 2:
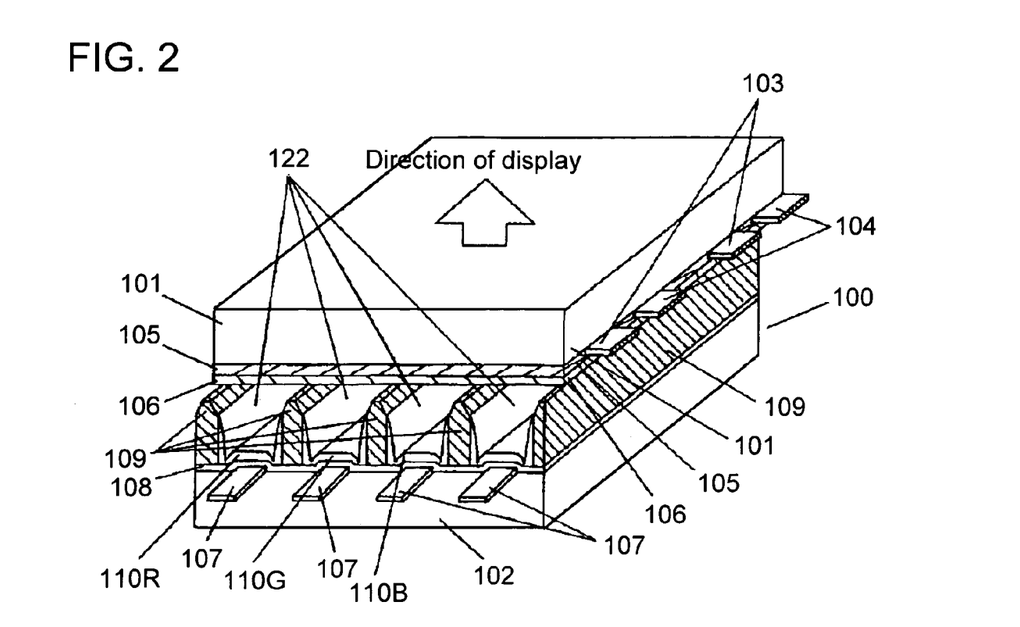
FIG. 2 is a sectioned perspective view showing a structure of an image display area of the PDP according to the exemplary embodiment of this invention.

FIG. 1 is a plan view of a PDP showing an electrode pattern, and FIG. 2 is a perspective view of an image display area of the PDP. In FIG. 1, groups of display electrodes, display scan electrodes and address electrodes are illustrated only partially to make them simple.

As shown in FIG. 1, PDP 100 comprises front glass substrate 101 (not show in the figure), rear glass substrate 102, number N of display electrodes 103, another number N of display scan electrodes 104 (a numeral of 1 through N is suffixed to indicate an ordinal position), number M of address electrodes 107 (a numeral of 1 through M is suffixed to indicate an ordinal position), and hermetic seal layer 121 shown by hatching. Groups of these electrodes 103, 104 and 107 compose a matrix of three electrode structure. A cell is formed in each of areas where display electrodes 103 and display scan electrodes 104 intersect address electrodes 107. Image display area 123 is formed inside of hermetic seal layer 121.

Figure 3:
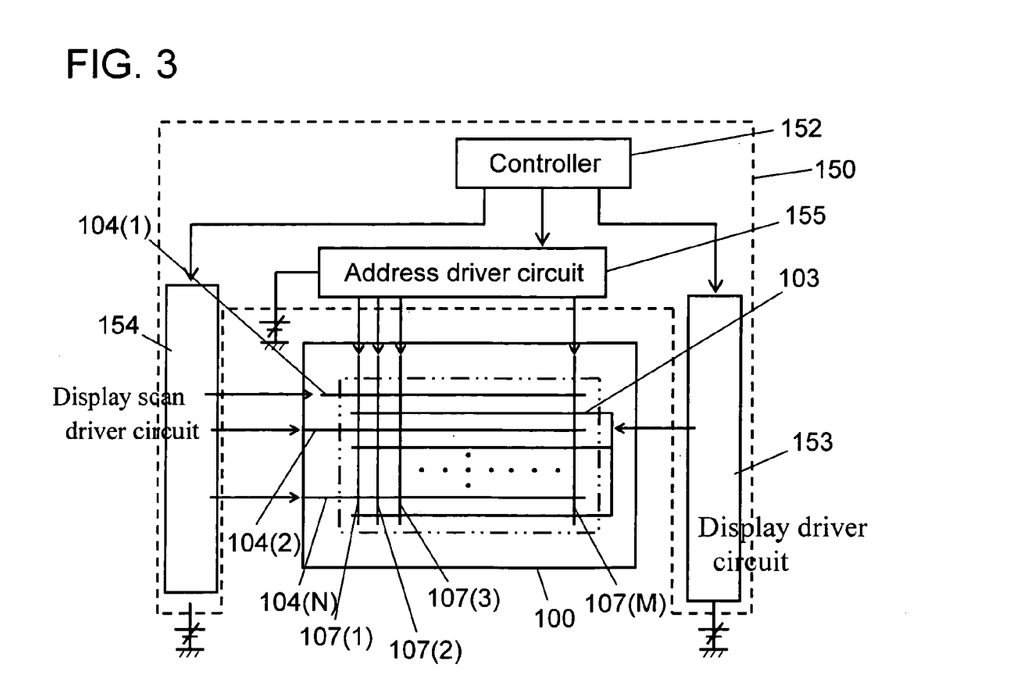
FIG. 3 is a block diagram depicting an operating architecture of a plasma display device according to the exemplary embodiment of this invention.

PDP 100 has a structure, as shown in FIG. 2, in which a front panel provided with display electrodes 103, display scan electrodes 104, dielectric glass layer 106 and MgO protective layer 106 formed on a main surface of front glass substrate 101 is bonded together with a rear panel provided with address electrodes 107, dielectric glass layer 108, barrier ribs 109, phosphor layers 110R, 110G and 110B formed on a main surface of rear glass substrate 102, and discharge spaces 122 formed between the front panel and the rear panel are filled with discharge gas. FIG. 3 is a block diagram showing a configuration of the plasma display device including driver circuits.

PDP 100 is provided with display driver circuit 153, display scan driver circuit 154 and address driver circuit 155, as shown in FIG. 3. These driver circuits are under the control of controller 152 to apply voltage between one of display scan electrodes 104 and one of address electrodes 107 corresponding to a cell to be lit, to initiate address discharge between them. The driver circuits then apply pulse voltage between one of display electrodes 103 and the display scan electrode 104 to carry out sustained discharge. The sustained discharge generates ultraviolet rays in the cell, and the ultraviolet rays excite phosphor layer 107 to illuminate and light the cell. A combination of lighting and no lighting of individual color cells produces an image on display.

Figure 4:
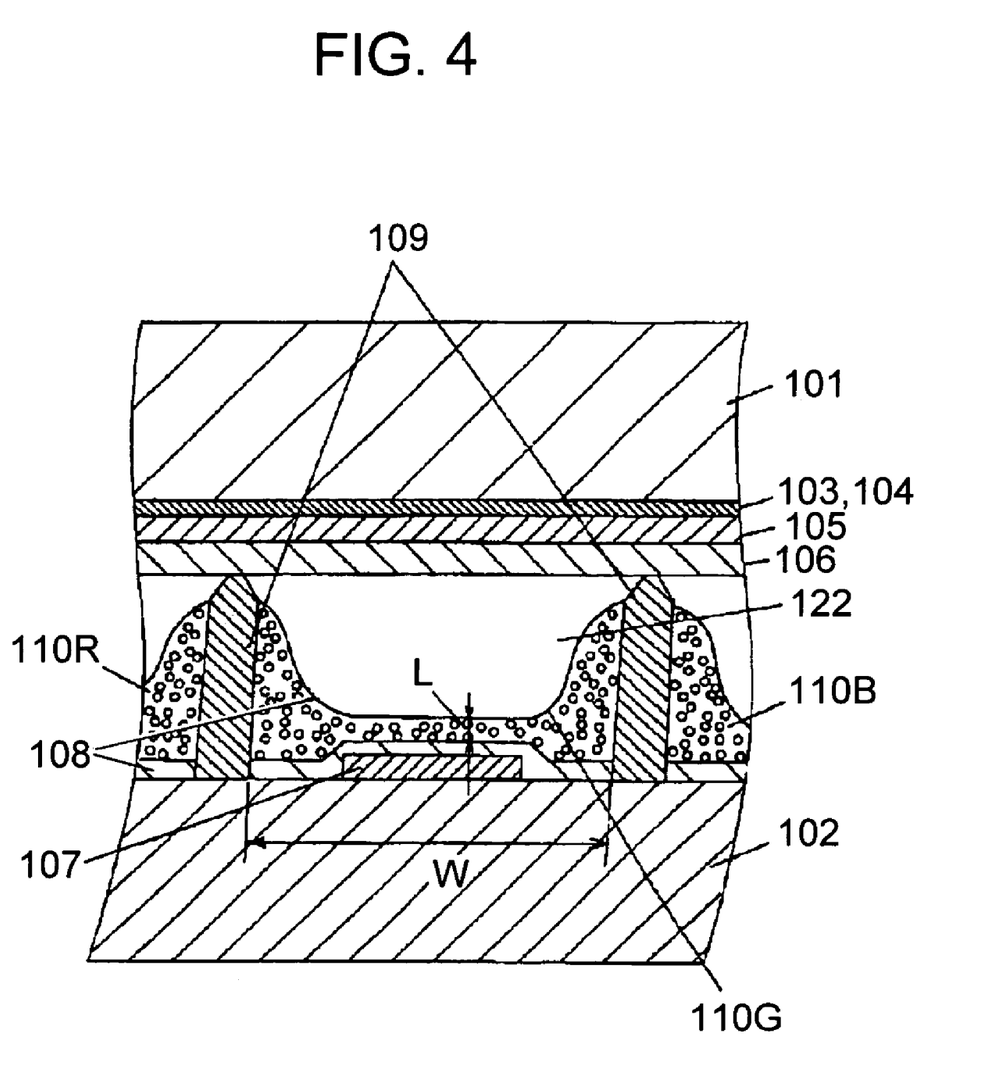
FIG. 4 is a sectioned view showing the structure of the image display area of the PDP according to the exemplary embodiment of this invention.
Figure 5:
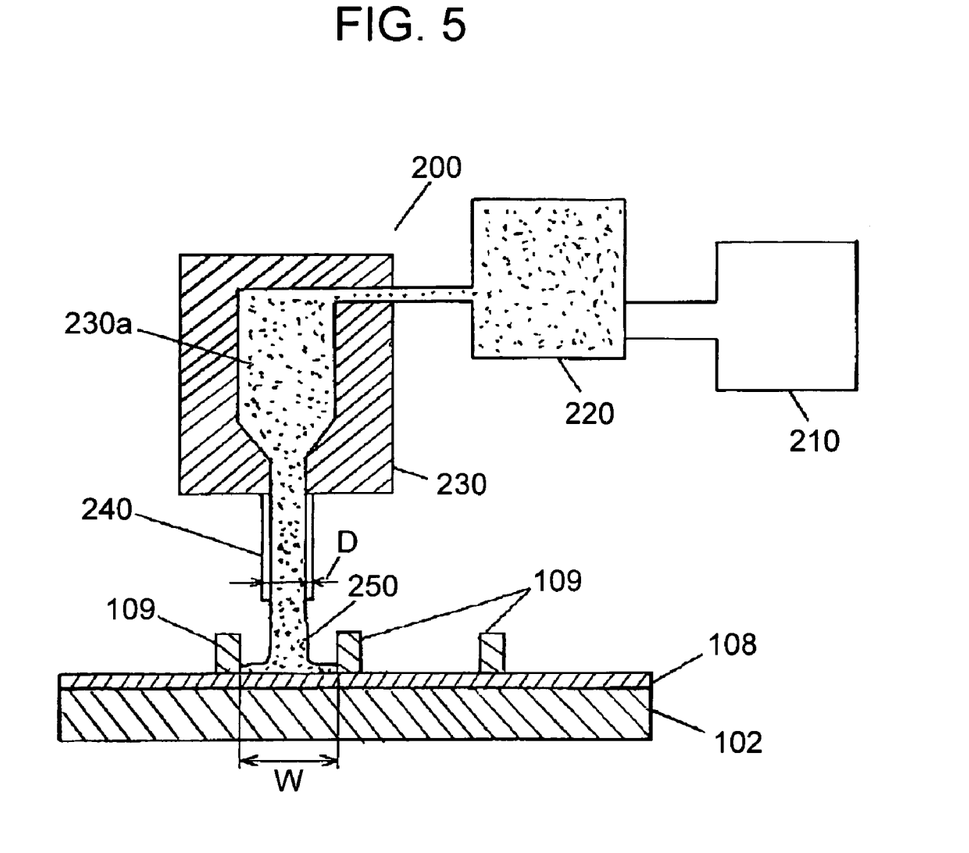
FIG. 5 is a diagrammatic drawing of an ink coating apparatus used for forming a phosphor layer of the PDP according to the exemplary embodiment of this invention.

Description is provided next of a method of manufacturing the above-said PDP with reference to FIG. 4 and FIG. 5. FIG. 4 is a sectional view of a PDP, and FIG. 5 is a sectional view of a phosphor ink coating apparatus.

A front panel is produced first by forming number N of display electrodes 103 and another number N of display scan electrodes 104 alternately and in parallel with each other into a stripe pattern on front glass substrate 101 (FIG. 2 shows only two each of these electrodes), covering the electrodes with dielectric glass layer 105, and forming again MgO protective layer 106 over the surface of dielectric glass layer 105.

Display electrodes 103 and display scan electrodes 104 have a structure comprising a transparent electrode made of ITO and a bus electrode made of silver. The bus electrode is formed by firing silver paste coated by using a screen printing method.

Dielectric glass layer 105 is formed into a predetermined layer thickness (approx. 20 μm) by coating a paste containing lead-based glass material by a screen printing method, followed by firing for a predetermined time at a predetermined temperature (at 560° C. for 20 minutes, for instance). One example of the paste containing lead-based glass material used is a mixture of PbO (70 wt-%), $B_2O_3$ (15 wt-%), $SiO_2$ (10 wt-%), $Al_2O_3$ (5 wt-%) and organic binder containing 10% of ethyl cellulose dissolved in α-terpineol. The organic binder used here comprises a resin material dissolved into organic solvent, and that acrylic resin can be used as the resin to replace the ethyl cellulose, and butyl-carbitol and the like can be used also as the organic solvent. In addition, dispersing agent such as glycerol-triolate may be mixed into the organic binder.

MgO protective layer 106 is made of magnesium oxide (MgO), and it is formed into a predetermined thickness (approx. 0.5 μm) by any such method as sputtering method and CVD method (i.e., chemical vapor deposition method).

On the other hand, a rear panel is produced with number M of address electrodes 107 in a parallel arrangement by filing the electrodes of silver paste formed on rear glass substrate 102 by any of screen printing method and a photography method. Paste containing lead-based glass material is coated over the electrodes by screen-printing method to form dielectric glass layer 108. Barrier ribs 109 are formed by coating repeatedly the same paste containing lead-based glass material by screen printing method, followed by firing. These barrier ribs 109 divide the space into individual cells of discharge spaces 122 (i.e., units of light-emitting domain) along one direction.

FIG. 4 is a sectional view of a part of PDP 100. As shown in FIG. 4, a dimension W of the spaces between the adjoining barrier ribs 109 is determined as to be about 130 to 240 μm according to 32 to 50 inch size of HD-TV screens. Each of grooves between barrier ribs 109 is provided with coating of one of red (R), green (G) and blue (B) color phosphors. The blue (B) color phosphor contains phosphor particles composed of one of $Ba_{1-x}MgAl_{10}O_{17}:Eu_x$ and $Ba_{1-x-y}Sr_yMgAl_{10}O_{17}:Eu_x$ (wherein amount x of the Eu is given as $0.2 \leq x \leq 0.8$), in which 15% to 75% of bivalent Eu ions are replaced by trivalent Eu ions. Phosphor inks of the individual colors in paste form composed of phosphor particles and organic binder are coated and fired at a temperature of 400 to 590° C. to burn out the organic binder and form phosphor layers 110R, 110G and 110B having tightly bonded phosphor particles. It is desirable to form these phosphor layers 110R, 110G and 110B so that a thickness L of them in a direction of coating on address electrodes 107 is about 8 to 25 times the mean particle size of the color phosphor particles. In other words, the phosphor layers need to ensure proper luminance (or, luminous efficiency) when they are irradiated with a given intensity of ultraviolet rays. For this reason, it is preferable that the phosphor layers have a thickness equivalent to at least eight layers of the phosphor particles, and equivalent to twenty layers is more desirable, in order to absorb the ultraviolet rays generated inside discharge spaces 122 without letting them pass through. Luminous efficiency of phosphor layers 110R, 110G and 110B generally saturate when the thickness is increased further, and they also reduce the dimension necessary to ensure a sufficient size of discharge spaces 122 if the thickness exceeds an equivalence of approximately twenty layers. When phosphor particles are sufficiently small in size and spherical in shape, as in the case of particles obtained by the hydrothermal synthesis and the like, they increase a filling density of the phosphor layers and an overall surface area of the phosphor particles, as compared to non-spherical phosphor particles, even when they both have equal thickness. They can thus increase a surface area of the phosphor particles that contributes the actual emission of light from the phosphor layers, and improve the luminous efficiency. Description will be provided later of a method of composing these phosphor layers 110R, 110G and 110B, and a method of manufacturing blue phosphor particles used for the blue phosphor layers in which 15% to 75% of bivalent Eu ions are replaced by trivalent Eu ions.

The front panel and the rear panel produced in the above processes are put together in a manner that electrodes 103 and 104 of the front panel orthogonally intersect with address electrodes 107 of the rear panel, with sealing glass material placed along their periphery. This combination is fired for 10 to 20 minutes at approx. 450° C., for instance, to form hermetic seal layer 121 (FIG. 1) which seals them airtight. After air inside discharge spaces 122 is pumped out to obtain a high level of vacuum ($1.1 \times 10^{-4}$ Pa, for instance), these spaces are filled with discharge gas (i.e., inert gas such as He—Xe group and Ne—Xe group) at a predetermined pressure to complete PDP 100.

FIG. 5 depicts a diagrammatic structure of an ink coating apparatus used for forming phosphor layers. As shown in FIG. 5, ink coating apparatus 200 comprises server: 210, pressurizing pump 220, header 230, and the like. Phosphor ink contained in server 210 is pressurized by pressurizing pump 220 and supplied to header 230. Header 230 is provided with ink chamber 230a and nozzle 240 (an inner diameter of 30 μm to 120 μm). The pressurized phosphor ink supplied to ink chamber 230a is discharged continuously from nozzle 240. It is preferable that nozzle 240 has an outer diameter D of 30 μm or larger to prevent it from being choked, but smaller than a widthwise space W (approx. 130 μm to 240 μm) between barrier ribs 109 to prevent it from flowing over the barrier ribs when being discharged. The diameter D is thus set normally to 30 μm to 130 μm.

Header 230 is designed to move linearly by a header driving mechanism (not show in the figure). When phosphor ink 250 is discharged continuously from nozzle 240 while header 230 is being driven, nozzle 240 discharges the phosphor ink uniformly along the groove between barrier ribs 109 on rear glass substrate 102. The phosphor ink used here is controlled in a manner to maintain the viscosity within a range of 1500 CP to 30000 CP (centipoises) at 25° C.

Server 210 is provided with a stirring apparatus (not show in the figure) which stirs the phosphor ink to prevent phosphor particles from precipitating. Header 230 is constructed integrally with ink chamber 230a and nozzle 240, and it is made of a metallic material by means of general machining and electric discharge machining.

The method described above is not only the way of forming the phosphor layers, but a number of other methods are also adoptable such as photo lithography, screen printing, placement of a film containing phosphor particles, and the like.

The phosphor ink includes phosphor particles of any one color, binder and solvent, which are mixed to a viscosity of 1500 to 30000 centipoises (CP). A surface-active agent, silica, dispersing agent (0.1 to 5 wt-.%), and the like may also be added if necessary.

Red phosphor used for mixing into phosphor ink includes such compounds known as $(Y,Gd)_{2-x}BO_3:Eu_x$ and $Y_{2-x}O_3:Eu_x$. They are compounds in which a part of Y element composing the parent material is replaced by Eu element. It is desirable here that amount X of the Eu element that has replaced the Y element is maintained within a range given by $0.05 \leq X \leq 0.20$. Any compound of a replaced amount larger than the above range is considered not practical for actual use, since it accelerates degradation of luminance although it increases the luminance. On the other hand, any compound of a replaced amount smaller than the above range is not suitable for use as phosphor, because the component ratio of the Eu element is too low as a main luminous body, it reduces the luminance.

Compounds known as $Ba_{1-x}Al_{10}O_{19}:Mn_x$ and $Zn_{2-x}SiO_4:Mn_x$ are used as green phosphor. $Ba_{1-x}Al_{10}O_{19}:Mn_x$ is a compound in which a part of Ba element composing the parent material is replaced by Mn element, and $Zn_{2-x}SiO_4:Mn_x$ is a compound in which a part of Zn element composing the parent material is replaced by Mn element. It is desirable here for the same reason as that described in the case of red phosphor, that amount X of the Mn element that has replaced any of the Ba element and Zn element is maintained within a range given by $0.01 \leq X \leq 0.10$.

Compounds known as $Ba_{1-x}MgAl_{10}O_{17}:Eu_x$ and $Ba_{1-x-y}Sr_yMgAl_{10}O_{17}:Eu_x$ are used as blue phosphor. They are such compounds in which a part of bivalent Ba element composing the parent material is replaced by bivalent Eu or bivalent Sr elements. It is desirable here that amount X of the Eu element that has replaced the Ba element and another amount Y of the Eu element that has replaced the Sr element are maintained within ranges given by $0.2 \leq X \leq 0.8$ and $0.1 \leq Y \leq 0.5$ respectively. It is further desirable that an amount of bivalent Eu ions replaced by trivalent Eu ions is maintained within a range of $0.15 \leq a \leq 0.75$ when the compound is expressed as $BaEu^{(+2)}_{1-a}Eu^{(+3)}_a MgAl_{10}O_{17}:Eu$. In other words, a range of 15% to 75% is especially desirable to prevent the phosphor from choking up the nozzle.

In preparation of the phosphor ink, ethyl cellulose and acrylic resin are used as a binder (0.1 to 10 wt-% of the ink is mixed), and α-terpineol and butyl-carbitol are suitable as a solvent for the mixture. It is also suitable to use polymeric resins such as PMA and PVA as the binder, and organic solvents such as diethylene glycol and methyl ether as the solvent.

EMBODIED EXAMPLE

Description is provided of a method used to compose phosphors of individual colors in this exemplary embodiment.

Describing first is a method of composing $Ba_{1-x}MgAl_{10}O_{17}:Eu_x$ used as a blue phosphor by using a hydrothermal synthesis method.

In a mixture preparation process, raw materials of barium nitrate, $Ba(NO_3)_2$, magnesium nitrate, $Mg(NO_3)_2$; aluminum nitrate, $Al(NO_3)_3$ and europium nitrate, $Eu(NO_3)_2$ are mixed into a molar ratio of 1-X:1:10:X (where $0.2 \leq X \leq 0.8$). The mixture is dissolved in aqueous medium to prepare a hydrated mixid solution. Ion exchanged water and pure water are suitable for use as the aqueous medium since they do not contain any impurities. However, the medium is still usable when it contains non-aqueous liquid such as methanol and ethanol.

Next, this hydrated mixid solution is put into a container made of a metal of high resistance to corrosion and heat such as gold and platinum. The hydrated mixid solution is then placed under a predetermined temperature (100 to 300° C.) and a predetermined pressure (0.2 to 10 MPa) by using an apparatus capable of heating with pressure such as an autoclave, to carry out the hydrothermal synthesis for about 12 to 20 hours to compose fine phosphor powder.

The powder is then fired at a predetermined temperature for a predetermined time (at 1350° C. for two hours, for example) in a reducing environment (e.g., environment containing 5% hydrogen and 95% nitrogen). After the fired powder is classified, it is again fired at 700 to 1100° C. in an oxidative environment containing any of oxygen ($O_2$), oxygen-nitrogen ($O_2$—$N_2$), water vapor-nitrogen ($H_2O$—$N_2$), and ozone-nitrogen ($O_3$—$N_2$). Although most of Eu ions present in the blue phosphor produced under the reducing environment are bivalent Eu ions, this firing process in the oxidative environment replaces 15% to 75% of the bivalent Eu ions with trivalent Eu ions. Amount of replacement from the bivalent ions to the trivalent ions can be controlled by adjusting an oxygen concentration, an oxidation time, and the oxidation temperature.

It is also possible to coat an oxide the surface of these phosphor particles as a protective film. That is, the protective film of an oxide such as $Al_2O_3$, $SiO_2$, $La_2O_3$ and the like can be formed while the phosphor particles are being fired in any of oxygen, oxygen-nitrogen ($O_2$—$N_2$), water vapor-nitrogen ($H_2O$—$N_2$) and ozone-nitrogen ($O_3$—$N_2$). For example, the phosphor particles are mixed with alcohol and organic compound containing the above elements (alkoxide and acetyl-acetone, for instance), and the organic compound is hydrolyzed on the surfaces of the phosphor particles, followed by removal of the alcohol and fixing thereafter. The protective films provided on the surfaces of the phosphor particles can further improve degradation in characteristic of the blue phosphor and prevent choke-up of the nozzle. Since the protective films are required to let the ultraviolet rays pass through, it is desirable that an amount used forte oxide coating is limited to the minimum necessary. It is very desirable to keep the thickness 0.1 µm or less, and especially more desirable to keep it 0.01 µm or less.

The phosphor particles obtained by the above hydrothermal synthesis method have spherical shape and small in size (i.e., a mean particle diameter of about 0.05 µm to 2.0 µm) as compared to those produced by the conventional method of solid phase reaction. The phosphor particles are termed "spherical" in this embodiment, because most of the phosphor particles have axial diametric ratio (i.e., minor axis diameter/major axis diameter) of 0.9 or larger but 1.0 or smaller, for instance. However, not all the phosphor particles need to be within this range.

The desired blue phosphor can also be produced, using blue phosphor particles obtained by a spray method in which the hydrated mixid solution obtained in the above-discussed mixture preparation process is sprayed into a high temperature furnace to compose blue phosphor. The blue phosphor is then fired in an environment filled with any of oxygen ($O_2$), oxygen-nitrogen ($O_2$—$N_2$), water vapor-nitrogen ($H_2O$—$N_2$) and ozone-nitrogen; ($O_3$—$N_2$).

Describing next pertains to a method of composing blue phosphor of $Ba_{1-x-y}Sr_yMgAl_{10}O_{17}:Eu_x$ by solid phase reaction method.

Raw materials of barium hydroxide, $Ba(OH)_2$, strontium hydroxide, $Sr(OH)_2$, magnesium hydroxide, $Mg(OH)_2$, aluminum hydroxide, $Al(OH)_3$, and europium hydroxide, $Eu(OH)_2$, are weighed to a molar ratio according to requirement. They are mixed with flux of $AlF_3$, and fired at 1100° C. in air. Thereafter, they are fired again at a predetermined temperature (e.g., between 1100 and 1600° C.) for two hours in a reducing environment (e.g., an environment of 5% hydrogen in 95% nitrogen). While the temperature starts falling from the firing point of 1100 to 1600° C. toward a range between 1100 and 700° C., one of oxygen ($O_2$), oxygen-nitrogen ($O_2$—$N_2$), water vapor-nitrogen ($H_2O$—$N_2$) and ozone-nitrogen ($O_3$—$N_2$) is introduced into the furnace to obtain blue phosphor in which a part of bivalent Eu ions is replaced by trivalent Eu ions.

Description is provided next of green phosphor of $Zn_{2-x}SiO_4:Mn_x$.

In a mixture preparation process, raw materials of zinc nitrate, $Zn(NO_3)$, silicon nitrate, $Si(NO_3)_2$ and manganese nitrate, $Mn(NO_3)_2$ are mixed first into a molar ratio of 2-X:1:X (where $0.01 \leq X \leq 0.10$). By using a spray atomizing method, this mixed solution is then sprayed from a nozzle into a high temperature furnace heated to 1500° C. while impressing ultrasonic waves, to produce green phosphor.

Description is provided next of green phosphor of $Ba_{1-x}AL_{12}O_{19}:Mn_x$.

In a mixture preparation process, raw materials of barium nitrate, $Ba(NO_3)_2$, aluminum nitrate, $Al(NO_3)_3$ and manganese nitrate, $Mn(NO_3)_2$ are mixed into a molar ratio of 1-X:12:X (where $0.01 \leq X \leq 0.10$). The mixture is dissolved in ion-exchanged water to prepare a mixed solution. In a hydration process, next, basic aqueous solution (ammonia solution, for instance) is drop-fed into this mixed solution to form: a hydrate. In a hydrothermal synthesis process, thereafter, this hydrate is put together with ion-exchanged water into a capsule made of a metal having resistance to corrosion and heat such as platinum and gold, and hydrothermal synthesis is carried out by heating them at a predetermined temperature and a predetermined pressure for a predetermined time (e.g., at 100 to 300° C. temperature, 0.2 to 10 MPa pressure for 2 to 20 hours) in a pressurized vessel such as an autoclave. The desired phosphor of $Ba_{1-x}Al_{12}O_{19}:Mn_x$ is obtained after they are subjected to a drying process. The phosphor obtained from this hydrothermal synthesis process has particle diameters of about 0.1 µm to 2.0 µm and spherical shape. The obtained powder is then subjected to an annealing process at 800 to 1100° C. temperature in air, and to classification thereafter to complete the green phosphor.

Description is provided next of red phosphor of $(Y,Gd)_{1-x}BO_3:Eu_x$.

In a mixture preparation process, raw materials of yttrium nitrate, $Y(NO_3)_3$, Gadolinium hydronitrate, $Gd(NO_3)_3$, boric acid, $H_3BO_3$, and europium nitrate, $Eu(NO_3)_2$, are mixed into a molar ratio of 1-X:2:X (where $0.05 \leq X \leq 0.20$, and a ratio of Y to Gd is 65:35). The mixture is then heat-treated for two hours in air at 1200 to 1350° C., and classified to obtain red phosphor.

Describing next is red phosphor of $Y_{2-x}O_3:Eu_x$.

In a mixture preparation process, raw materials of yttrium nitrate, $Y(NO_3)_3$, and europium nitrate, $Eu(NO_3)_2$, are mixed and dissolved in ion-exchanged water to prepare a mixed solution of a molar ratio of 2-X:X (where $0.05 \leq X \leq 0.30$). The mixed solution is added with basic aqueous solution (ammonia solution, for instance) to form a hydrate in a hydration process. In a hydrothermal synthesis process, thereafter, this hydrate is put together with ion-exchanged water into a container made of a metal having resistance to corrosion and heat such as platinum and gold, and hydrothermal synthesis is carried out by heating them at a temperature of 100 to 300° C. and a pressure of 0.2 to 10 MPa for 3 to 12 hours in a pressurized vessel such as an autoclave. The phosphor powder is then annealed for two hours in air at 1300 to 1400° C., and classified to obtain red phosphor. The phosphor obtained from this hydrothermal synthesis process has particle diameter of about 0.1 µm to 2

μm and spherical shape. This particle diameter and the shape are suitable for forming phosphor layers of excellent luminous property.

In this embodiment, phosphor layers 110R and 110G of PDP 160 discussed above were formed by using phosphors of the prior art, whereas phosphor layer 110B was formed of phosphor particles in which a part of bivalent Eu ions is replaced by trivalent Eu ions. Since blue phosphor of the prior art exhibits especially a greater degradation in each of the processes as compared to the blue phosphor of this invention, it tends to decrease a color temperature when three colors are lit simultaneously. For this reason, it was necessary to reduce luminance of phosphor cells other than blue cells (i.e., red and green cells) in a plasma display device in order to improve color temperature of white display. However, the blue phosphor manufactured by the method of this invention, if used, makes no longer necessary an intentional reduction of luminance of the other color cells since luminance of the blue cells increases but its degradation is not significant during manufacturing process of the panel. Therefore, the invention can increase luminance of the plasma display device while maintaining a high color temperature of white display, since it can make full use of the luminance of the all color cells.

Moreover, the blue phosphor according to this invention can be applied also to fluorescent lamps that are excited by the same ultraviolet rays to produce light. This can be achieved simply by coating a phosphor layer on an interior wall of fluorescent lamp using blue phosphor in which bivalent Eu ions composing ordinary blue phosphor particles are replaced by trivalent Eu ions. This invention, when adopted in this manner, can provide the fluorescent lamps with excellent luminance and less degradation of the luminance as compared to the conventional fluorescent lamps.

To evaluate performances of plasma display devices of this invention, we made samples of individual phosphors and plasma display devices using the phosphor samples, and conducted experiments for the evaluation as follows.

Each plasma display device produced here has a diagonal screen of 42 inches (HD-TV specification having rib pitches of 150 μm), a dielectric glass layer of 20 μm thickness, an MgO protective layer of 0.5 μm thickness, and a distance of 0.08 mm between display electrodes and display scan electrodes. A discharge space is filled with a predetermined pressure of discharge gas composed primarily of neon gas mixed with 5% xenon.

Table 1 shows conditions and specifications of composition of each phosphor sample. Blue phosphor used for each of the plasma display devices shown as samples 1 through 9 in the table is one of compounds, $Ba_{1-x}MgAl_{10}O_{17}:Eu_x$ and $Ba_{1-x-y}Sr_yMgAl_{10}O_{17}:Eu_x$ (where x and y are given as $0.2 \leq x \leq 0.8$ and $0.1 \leq y \leq 0.5$ respectively) of which 15% to 75% of bivalent Eu ions of phosphor particles are replaced by trivalent Eu ions.

Samples 1 to 4 have a combination of $(Y,Gd)_{2-x}BO_3:Eu_x$ for red phosphor, $Zn_{2-x}SiO_4:Mn_x$ for green phosphor, and $Ba_{1-x}MgAl_{10}O_{17}:Eu_x$ for blue phosphor. Variations of these phosphors include composing method, replacement ratio of the main luminous body of Eu or Mn, i.e., ratio of Y element or Ba element replaced by Eu element, or Zn element replaced by Mn element and amount (ratio) of trivalent Eu ions which replaces bivalent B ions, as shown in Table 1. In addition, blue phosphors of the samples 1 to 4 have their particles coated by oxide by means of hydrolysis using metal-alkoxide or acetyl-acetone.

Samples 5 to 9 have a combination of $Y_{2-x}O_3:Eu_x$ for red phosphor, $Ba_{1-x}Al_{12}O_{19}:Mn_x$ for green phosphor, and $Ba_{1-x-y}Sr_yMgAl_{10}O_{17}:Eu_x$ for blue phosphor. Like the above samples, these phosphors are given variations in condition of composing method, replacement ratio of the main luminous body, and amount (ratio) of trivalent Eu ions which replaces bivalent E ions composing the blue phosphor, as shown In Table 1. Furthermore, the samples 5 to 9 have their particles coated by oxide by means of hydrolysis.

TABLE 1

| | Blue Phosphor [$Ba_{1-x}MgAl_{10}O_{17}:Eu_x$] | | | | Red Phosphor [$(Y,Gd)_{1-x}BO_3:Eu_x$] | | | Green Phosphor [$(Zn_{2-x}Mn_x)_2SiO_4$] | |
|---|---|---|---|---|---|---|---|---|---|
| Sample No. | Amount of Eu (x) | Mnfg. method | Method of replacing bivalent-Eu by trivalent-Eu | % amount of trivalent-Eu against bivalent-Eu | Film Coating | Amount of Eu (x) | Mnfg. method | Amount of Mn (x) | Mnfg. method |
| 1 | x = 0.2 | Hydro-Thermal synthesis | Oxidize 60 min at 700 C. in $N_2 \cdot O_2$ (1%) | 15.0% | $Al_2O_3$ | x = 0.1 | Solid phase reaction | x = 0.01 | Spray method |
| 2 | x = 0.3 | Solid phase reaction (Flux) | Oxidize 60 min at 800 C. in $H_2O \cdot O_2$ (1%) | 20.0% | $SiO_2$ | x = 0.2 | Spray method | x = 0.02 | Hydro-Thermal synthesis |
| 3 | x = 0.4 | Spray method | Oxidize 60 min at 950 C. in $N_2 \cdot O_2$ (3%) | 40.0% | $La_2O_3$ | x = 0.3 | Aqueous solution method | x = 0.05 | Solid phase reaction |

| | Blue Phosphor [$Ba_{1-x-y}Sr_yMgAl_{10}O_{17}:Eu_x$] | | | | Red Phosphor [$(Y_{1-x})_2O_3:Eu_x$] | | | Green Phosphor [$Ba_{1-x}Al_{12}O_{19}:Mn_x$] | |
|---|---|---|---|---|---|---|---|---|---|
| Sample No. | Amount of Eu, Sr (x, y) | Mnfg. method | Method of replacing bivalent Eu by trivalent Eu | % amount of trivalent-Eu against bivalent-Eu | Film Coating | Amount of Eu (x) | Mnfg. method | Amount of Mn (x) | Mnfg. method |
| 5 | X = 0.2 Y = 0.1 | Solid phase reaction | Oxidize in $N_2 \cdot O_2$ (20%) at | 15.0% | $SiO_2$ | x = 0.01 | Hydro-Thermal | x = 0.01 | Hydro-Thermal |

TABLE 1-continued

| | | (Flux) | descending temp of 700 C. or lower | | | | synthesis | | synthesis |
|---|---|---|---|---|---|---|---|---|---|
| 7 | X = 0.4<br>Y = 0.5 | Spray method | Oxidize in $N_2 \cdot O_3$ (1%) at descending temp of 950 C. or lower | 40.0% | None | x = 0.15 | Aqueous solution method | x = 0.05 | Solid phase reaction |
| 8 | X = 0.5<br>Y = 0.3 | Solid phase reaction | Oxidize 60 min at 100 C. in $H_2O$ (0.5%)-$N_2$ | 50.0% | None | x = 0.2 | Solid phase reaction | x = 0.1 | Solid phase reaction |
| 9 | X = 0.5<br>Y = 0.3 | Solid phase reaction | Oxidize 60 min at 1100 C. in $N_2$-(5%) $O_2$ | 60.0% | None | x = 0.2 | Solid phase reaction | x = 0.1 | Solid phase reaction |
| 10* | X = 0.15<br>Y = 0.5 | Solid phase reaction | Oxidize 60 min at 1000 C. in $N_2$-(20%) $O_2$ | 80.0% | None | x = 0.15 | Aqueous solution method | x = 0.01 | Hydro-Thermal synthesis |
| 11* | X = 0.3<br>Y = 0.3 | Solid phase reaction | No treatment | None | None | x = 0.15 | Aqueous solution method | x = 0.01 | Hydro-Thermal synthesis |

*Sample numbers 10 and 11 represent reference samples.

Phosphor inks used to form the phosphor layers in manufacturing the PDPs were produced by mixing the phosphors shown in Table 1, resin, solvent and dispersing agent. All phosphor inks were produced to keep viscosity in a range of 1500 CP to 30000 CP at 25° C. Observation of the formed phosphor layers showed that the phosphor inks are uniformly coated over the barrier ribs of the all samples, and there was no choking in a nozzle while discharging. Furthermore, phosphor particles used for the phosphor layers of all colors were 0.1 μm to 3.0 μm in the mean particle diameter with the maximum diameter not exceeding 8 μm for all samples.

Sample 10 was made using blue phosphor of $Ba_{1-x}MgAl_{10}O_{17}:Eu_x$, of which an amount x of Eu is 0.15 and a ratio of the trivalent Eu ions is 80%. Sample 11 was made using blue phosphor of $Ba_{1-x-y}Sr_yMgAl_{10}O_{17}:Eu_x$ of which an amount x of Eu is 0.3, an amount y is 0.3, and almost all Eu ions are bivalent since it was not processed in an oxidative environment.

Bivalent and trivalent Eu ions shown in Table 1 were measured by an XANES method (i.e., X-ray absorption near edge structure).

Experiment 1

Luminance of blue color and a rate of change of the luminance were examined on the produced samples 1 to 9 and the reference samples 10 and 11 before and after the phosphor firing process (at 520° C. for 20 minutes) in the rear panel manufacturing process. In this evaluation, measurements were made of luminance of the phosphor particles before firing, and luminance of coated ink after the firing.

Experiment 2

Measurements were made of a change in the luminance of the blue phosphor before and after the panel bonding process (i.e., the sealing process at 450° C. for 20 minutes) in the PDP manufacturing process.

Experiment 3

In the examination of luminance and change of the luminance when the PDPs were lit in blue color, measurements were taken of luminance of the plasma display panels before and after they were operated with discharge sustaining pulses of 200V and 100 kHz frequency continuously for 100 hours, and a ratio of luminance degradation (i.e., [luminance after the operation−luminance before the operation]/luminance before the operation×100) was obtained on each panels.

Addressing failure during address discharge were examined by observing flickers in images, and a result is recorded as "presence" of error even when it is only in one spot. A nozzle having an 80 μm diameter opening used in a phosphor coating process of inkjet method is examined for presence of choke-up in the opening after 200 hours of continuous coating operation.

Table 2 shows results of the experiments 1 through 3 for the luminance and rates of luminance degradation.

TABLE 2

| Sample No. | Luminance degradation rate (%) after phosphor firing at 520 C. in rear panel process Blue color | Luminance degradation rate (%) after 450 C. of panel sealing process Blue color | Luminance degradation rate (%) after 100 hrs of 200 V, 100 kHz sustaining pulses Blue color | Addressing failure in address discharge & nozzle choke-up after 200 hrs Yes or No | Luminance of full blue color screen cd/cm$^2$ |
|---|---|---|---|---|---|
| 1 | 0.0 | −0.1 | −0.2 | No—No | 97.3 |
| 2 | 0.1 | 0.1 | −0.3 | No—No | 95.1 |
| 3 | 0.0 | 0.2 | 0.2 | No—No | 94.1 |
| 4 | 0.1 | 0.1 | −0.2 | No—No | 93.2 |

TABLE 2-continued

| Sample No. | Luminance degradation rate (%) after phosphor firing at 520 C. in rear panel process Blue color | Luminance degradation rate (%) after 450 C. of panel sealing process Blue color | Luminance degradation rate (%) after 100 hrs of 200 V, 100 kHz sustaining pulses Blue color | Addressing failure in address discharge & nozzle choke-up after 200 hrs Yes or No | Luminance of full blue color screen cd/cm² |
|---|---|---|---|---|---|
| 5 | 0.1 | −0.1 | −0.1 | No—No | 93 |
| 6 | 0.1 | 0.1 | −0.1 | No—No | 94.1 |
| 7 | 0.2 | 0.2 | −0.2 | No—No | 97 |
| 8 | 0.1 | 0.3 | −0.2 | No—No | 91.6 |
| 9 | 0.2 | 0.2 | −0.2 | No—No | 96 |
| 10* | 0.3 | 0.2 | −0.3 | No—No | 65 |
| 11* | −6.5 | −22.5 | −30 | Yes—Yes | 50.1 |

*Sample numbers 10 and 11 represent reference samples.

As shown in Table 2, reference sample 10 having so small an amount of Eu as 0.15, and 80% of them being trivalent Eu ions exhibited a small degradation in any of the processes, which are acceptable. However, the luminance is relatively low when the screen is lighted in full blue color.

On the other hand, reference sample 11 shows substantial degradations after the processes, since bivalent Eu ions of the blue phosphor in this sample are not replaced by trivalent Eu ions. It exhibited luminance degradations of 6.5% in the phosphor firing process, 22.5% in the sealing process, and 30% after the accelerated life test of 200V and 100 kHz. Furthermore, it also showed addressing failure and choke-up of the splay nozzle. On any of the samples 1 through 9, on the other hand, rate of luminance degradation did not exceed 0.3% after the work processes, and there was no addressing failure. These advantages are attributable to the compounds of the blue phosphor, or $Ba_{1-x}MgAl_{10}O_{17}:Eu_x$ and $Ba_{1-x-y}Sr_yMgAl_{10}O_{17}:Eu_x$, of which amount x of Eu is increased to 0.2 to 0.8, more than that of the previous compounds, and 15 to 75% of bivalent Eu ions are replaced by trivalent Eu ions. Oxygen vacancies in the blue phosphor (especially, oxygen vacancies in the vicinity of a Ba—O layer) thus decrease substantially. Because of these phosphor compounds, it is thought that water in the atmosphere and released from an MgO film, barrier ribs, sealing frit material, phosphor and the like is not adsorbed to a deficiency layer (i.e., oxygen vacancies in the vicinity of the Ba—O layer) on the phosphor during firing of the phosphor and sealing of the panel.

Experiment 4

For a model experiment, another phosphor sample was made using blue phosphor containing amount x of Eu as large as 0.2 to 0.8, but bivalent Eu ions are not replaced by trivalent Eu ions. After the sample was left in an ambient of 60° C. and relative humidity of 90% for ten minutes, it was dried at 100° C. This sample and the phosphor samples shown in Table 1 were then TDS-analyzed (i.e., temperature-programmed desorption-gas chromatography-mass spectrometry). As a result, the sample showed a peak of physisorption (about 100° C.) and chemisorption (300 to 500° C.) of water 30 times greater than the samples 1 through 10 made with the ion replacement process.

Experiment 5

In the above experiment 1, the blue phosphor of this invention was used for the plasma display device. Here, the phosphor is used for a sample of fluorescent lamp which is excited by ultraviolet rays emitted light in the like manner. In a fluorescent lamp of well-known structure, the phosphors of all colors prepared under the condition of sample 7 shown in Table 1 were mixed, and coated as a phosphor layer on the interior wall of a glass tube. This fluorescent lamp was designated sample 12. Another fluorescent lamp was made in the same manner as a reference sample for which the phosphors of all colors prepared by the conventional solid phase reaction method and listed as sample 11 in Table 1 were mixed and coated, and it is designated sample 13.

Table 3 shows a result of the test.

TABLE 3

| Sample No. | Type of Phosphors | Luminance (cd/m2) | Luminance degradation rate after 5000 hrs of use with 100 V, 60 Hz |
|---|---|---|---|
| 12 | Phosphor of sample 7 | 7,550 | −0.30% |
| 13 | Phosphor of sample 11 | 6,700 | −14.1% |

*Sample number 13 represents a reference sample.

The result in Table 3 shows that the phosphors of this invention exhibit small rate of luminance degradation even when they are used for a fluorescent lamp.

INUSTRIAL APPLICABILITY

According to the present invention, as described above, phosphor layers include a blue phosphor layer comprising one of compounds symbolized by $Ba_{1-x}MgAl_{10}O_{17}:Eu_x$ and $Ba_{1-x-y}Sr_yMgAl_{10}O_{17}:Eu_x$, its phosphor having 0.2 to 0.8 in number x of Eu atoms, and the Eu atoms comprising 25% to 85% concentration of bivalent Eu ions and 15% to 75% concentration of trivalent Eu ions. This invention can thus prevent degradation of the phosphor layer in a series of processes, improve luminance and longevity of PDP and fluorescent lamp, and improve reliability.

The invention claimed is:

1. A plasma display device comprising:
   a plasma display panel including a plurality of disposed discharge cells having one of one color and a respective plurality of colors, and disposed phosphor layers that have respective colors corresponding to the respective discharge cells and are excited by ultraviolet rays to emit light, wherein
   the phosphor layers are excited by ultraviolet rays to emit light, the phosphor layers include a blue phosphor layer comprising a phosphor represented by one of $Ba_{1-x}MgAl_{10}O_{17}:Eu_x$ and $Ba_{1-x-y}Sr_yMgAl_{10}O_{17}:Eu_x$, wherein x is 0.2 to 0.8, y is 0.1 to 0.5, and the Eu atoms comprise 25% to 80% concentration of bivalent Eu ions and 20% to 75% concentration of trivalent Eu ions, and further wherein the blue phosphor layer is fired at 950 to 1100° C. in an oxidation atmosphere of oxygen, oxygen-nitrogen, ozone-nitrogen or steam($H_2O$)-nitrogen ($N_2$).

2. A phosphor for emitting visible light of blue color when excited by ultraviolet rays, said phosphor having a crystal structure represented by one of $Ba_{1-x}MgAl_{10}O_{17}:E_x$ and $Ba_{1-x-y}Sr_yMgAl_{10}O_{17}:Eu_x$, wherein x is 0.2 to 0.8, y is 0.1 to 0.5, and the Eu atoms comprise 25% to 80% concentration of bivalent Eu ions, and 20% to 75% concentration of trivalent Eu ions, and further wherein the blue phosphor is fired at 950 to 1100° C. in an oxidation atmosphere of oxygen, oxygen-nitrogen, ozone-nitrogen or steam($H_2O$)-nitrogen ($N_2$).

3. A method of manufacturing phosphor comprising:

replacing 20% to 75% of bivalent Eu ions with trivalent Eu ions by firing blue phosphor represented by one of $Ba_{1-x}MgAl_{10}O_{17}:E_x$ and $Ba_{1-x-y}Sr_yMgAl_{10}O_{17}:Eu_x$ in an oxidative environment, wherein x is 0.2 to 0.8, y is 0.1 to 0.5, and the Eu atoms comprise 25% to 80% concentration of bivalent Eu ions, and the blue phosphor having bivalent Eu ions as a main luminous body for emitting visible light when excited by ultraviolet rays, and further wherein the blue phosphor is fired at 950 to 1100° C. in an oxidation atmosphere of oxygen, oxygen-nitrogen, ozone-nitrogen or steam($H_2O$)-nitrogen ($N_2$).

4. A method of manufacturing phosphor comprising:

mixing, in an alcoholic solvent, blue phosphor particles with any of alkoxide and acetyl-acetone containing Al, La and Si elements, wherein the phosphor particles are represented by one of $Ba_{1-x}MgAl10O_{17}:Eu_x$ and $Ba_{1-x-y}Sr_yMgAl_{10}O_{17}:Eu_x$, wherein x is 0.2 to 0.8 and y is 0.1 to 0.5, and the phosphor particles have bivalent Eu ions as a main luminous body;

hydrolyzing the mixture; and forming one oxide of the Al, La and Si elements on a surface of the phosphor while replacing 20% to 75% of bivalent Eu ions with trivalent Eu ions by fixing the hydrolyzed mixture in an oxidative environment after removal of alcohol, and further wherein the blue phosphor particles are fired at 950 to 1100° C. in an oxidation atmosphere of oxygen, oxygen-nitrogen, ozone-nitrogen or steam($H_2O$)-nitrogen ($N_2$).

5. A method of manufacturing phosphor comprising:

mixing any of oxide, carbonate compound and metallic salt containing Ba, Sr, Mg, Al and Eu with flux;

resolving carbonate and salt by firing the mixture in air;

changing a state of Eu atoms into bivalent ions by firing the phosphor in a reducing environment; and adjusting a concentration of bivalent Eu ions to 25% to 80% and a concentration of trivalent Eu ions to 20% to 75% by firing the phosphor in an oxidative environment of oxygen, oxygen-nitrogen, ozone-nitrogen or steam($H_2O$)-nitrogen ($N_2$), at 950 to 1100° C., wherein the compound is represented by one of $Ba_{1-x}MgAl_{10}O_{17}:Eu_x$ and $Ba_{1-x-y}Sr_yMgAl_{10}O_{17}:Eu_x$, wherein x is 0.2 to 0.8 and y is 0.1 to 0.5.

* * * * *

UNITED STATES PATENT AND TRADEMARK OFFICE
CERTIFICATE OF CORRECTION

PATENT NO.       : 7,183,705 B2
APPLICATION NO.  : 10/485148
DATED            : February 27, 2007
INVENTOR(S)      : Masaki Aoki et al.

It is certified that error appears in the above-identified patent and that said Letters Patent is hereby corrected as shown below:

In column 19, line 3, "$Ba_{1-x}MgAl_{10}O\ _{17}:Eu_x$" has been amended to --$Ba_{1-x}MgAl_{10}O_{17}:Eu_x$--.

In column 19, line 16, "$Ba_{1-x}MgAl_{10}O_{17}:E_x$" has been amended to --$Ba_{1-x}MgAl_{10}O_{17}:Eu_x$--.

In column 19, line 17, "$Ba_{1-x}Sr_yMgAl_{10}O_{17}:Eu_x$" has been amended to --$Ba_{1-x-y}Sr_yMgAl_{10}O_{17}:Eu_x$--.

In column 19, line 25, "steam($H_2$,O)-nitrogen" has been amended to --steam($H_2O$)-nitrogen--.

In column 19, line 30, "$Ba_{1-x}MgAl_{10}O_{17}:E_x$" has been amended to --$Ba_{1-x}MgAl_{10}O_{17}:Eu_x$--.

In column 20, line 8, "$Ba_{1-x}MgAl10O_{17}:Eu_x$" has been amended to --$Ba_{1-x}MgAl_{10}O_{17}:Eu_x$--.

In column 20, line 15, "by fixing the" has been amended to --by firing the--.

Signed and Sealed this

First Day of May, 2007

JON W. DUDAS
*Director of the United States Patent and Trademark Office*